(12) United States Patent
Langwieser et al.

(10) Patent No.: US 10,691,101 B2
(45) Date of Patent: Jun. 23, 2020

(54) METHOD FOR TRANSPORTING CONTAINERS

(71) Applicant: KRONES AG, Neutraubling (DE)

(72) Inventors: Sebastian Langwieser, Abensberg (DE); Dieter Finger, Neutraubling (DE); Helmut Schneider, Regensburg (DE); Johannes Strauss, Wolfsegg (DE)

(73) Assignee: Krones AG, Neutraubling (DE)

( * ) Notice: Subject to any disclaimer, the term of this patent is extended or adjusted under 35 U.S.C. 154(b) by 21 days.

(21) Appl. No.: 15/776,393

(22) PCT Filed: Oct. 19, 2016

(86) PCT No.: PCT/EP2016/075026
§ 371 (c)(1),
(2) Date: May 15, 2018

(87) PCT Pub. No.: WO2017/092925
PCT Pub. Date: Jun. 8, 2017

(65) Prior Publication Data
US 2018/0346257 A1 Dec. 6, 2018

(30) Foreign Application Priority Data
Dec. 1, 2015 (DE) .......................... 10 2015 223 933

(51) Int. Cl.
*G05B 19/4062* (2006.01)
*B65G 47/84* (2006.01)
*B65G 43/10* (2006.01)

(52) U.S. Cl.
CPC ......... *G05B 19/4062* (2013.01); *B65G 43/10* (2013.01); *B65G 47/846* (2013.01);
(Continued)

(58) Field of Classification Search
CPC .......... G05B 2219/41474; G05B 2219/41427; G05B 19/4062
See application file for complete search history.

(56) References Cited

U.S. PATENT DOCUMENTS 5,055,754 A * 10/1991 Kishi .................... G05B 19/232
318/565
5,757,147 A 5/1998 Blumoer et al.
(Continued)

FOREIGN PATENT DOCUMENTS

DE    102011001278 A1   3/2014
EP       0658832 A2     6/1995
(Continued)

OTHER PUBLICATIONS

International Search Report and Written Opinion for International Application No. PCT/EP2016/075026 dated Feb. 1, 2017.

*Primary Examiner* — Thomas Randazzo
(74) *Attorney, Agent, or Firm* — Lowenstein Sandler LLP

(57) ABSTRACT

A device for transporting containers comprises at least two transport devices for the containers, at least two servo motors, at least two position sensors, and at least one control unit. The at least one control unit is to control the at least two servo motors, by closed-loop control, based on a comparison of positions determined by respective position sensors of the at least two position sensors and respective target positions. The at least one control unit is further to bring the at least two servo motors to a standstill in the event of a fault of a position sensor, wherein: a) a servo motor is brought to a standstill in a closed-loop manner using the position if it is determinable by the position sensor, or b) the servo motor is brought to a standstill in an open-loop manner based on the target position if the position is not determinable.

20 Claims, 2 Drawing Sheets

(52) U.S. Cl.
CPC ........... *B65G 2201/0244* (2013.01); *G05B 2219/41427* (2013.01); *G05B 2219/41474* (2013.01); *G05B 2219/42019* (2013.01); *G05B 2219/42032* (2013.01)

(56) References Cited

U.S. PATENT DOCUMENTS

| | | | | |
|---|---|---|---|---|
| 5,833,127 A * | 11/1998 | Powell | ................ | B23K 20/121 228/102 |
| 5,970,763 A * | 10/1999 | Takayama | ............ | B21D 43/055 72/1 |
| 6,000,525 A * | 12/1999 | Frulio | ................... | B65B 35/243 198/400 |
| 8,497,447 B2 * | 7/2013 | Heiml | ..................... | B23P 21/00 219/121.41 |
| 2007/0028563 A1 * | 2/2007 | Fritsche | .................... | B65C 3/20 53/410 |
| 2009/0033272 A1 | 2/2009 | Winterhalter | | |
| 2009/0188773 A1 | 7/2009 | Shimomura | | |
| 2011/0272246 A1 * | 11/2011 | Papsdorf | ................ | B65G 29/00 198/473.1 |
| 2016/0334760 A1 * | 11/2016 | Kameta | .................... | B23Q 5/58 |

FOREIGN PATENT DOCUMENTS

| | | | |
|---|---|---|---|
| EP | 1967927 | A2 | 9/2008 |
| EP | 1967927 | A2 | 10/2008 |

* cited by examiner

METHOD FOR TRANSPORTING CONTAINERS

RELATED APPLICATIONS

This application claims the benefit of International Application No. PCT/EP2016/075026, filed Oct. 19, 2016, that claims priority to German Application No. 102015223933.0, filed Dec. 1, 2015. The entire contents of both applications are hereby incorporated by reference.

TECHNICAL FIELD

The present disclosure relates to a method for transporting containers, and to a device for transporting containers.

BACKGROUND

Method and devices for transporting containers, for example bottles, in the beverage processing industry are well-known from prior art. It is common to transport containers through a container treatment plant, for example, by means of transfer starwheels. Individual container treatment machines of the container treatment plant may be designed as rotary or linearly operating machines. In particular with rotary machines, a synchronization of the movement in the direction of transport of successive machines is required. If this synchronization is not provided, malfunctions and, in the worst case, damages to the transfer starwheels or container treatment machines may occur.

To keep damages as low as possible, it is known, for example, from EP 1 967 927 A2 to bring the servo motors that drive the relevant devices to a standstill if a fault is detected in the numerical control. This is done by outputting a speed command of the value 0 to the servo motor, and optionally additionally by mechanical braking. Though the corresponding servo motors may thus be brought to a standstill very quickly, considerable damages nevertheless occur due to a lack of synchronization of the movements of the individual devices.

DETAILED DESCRIPTION

Figure 1:
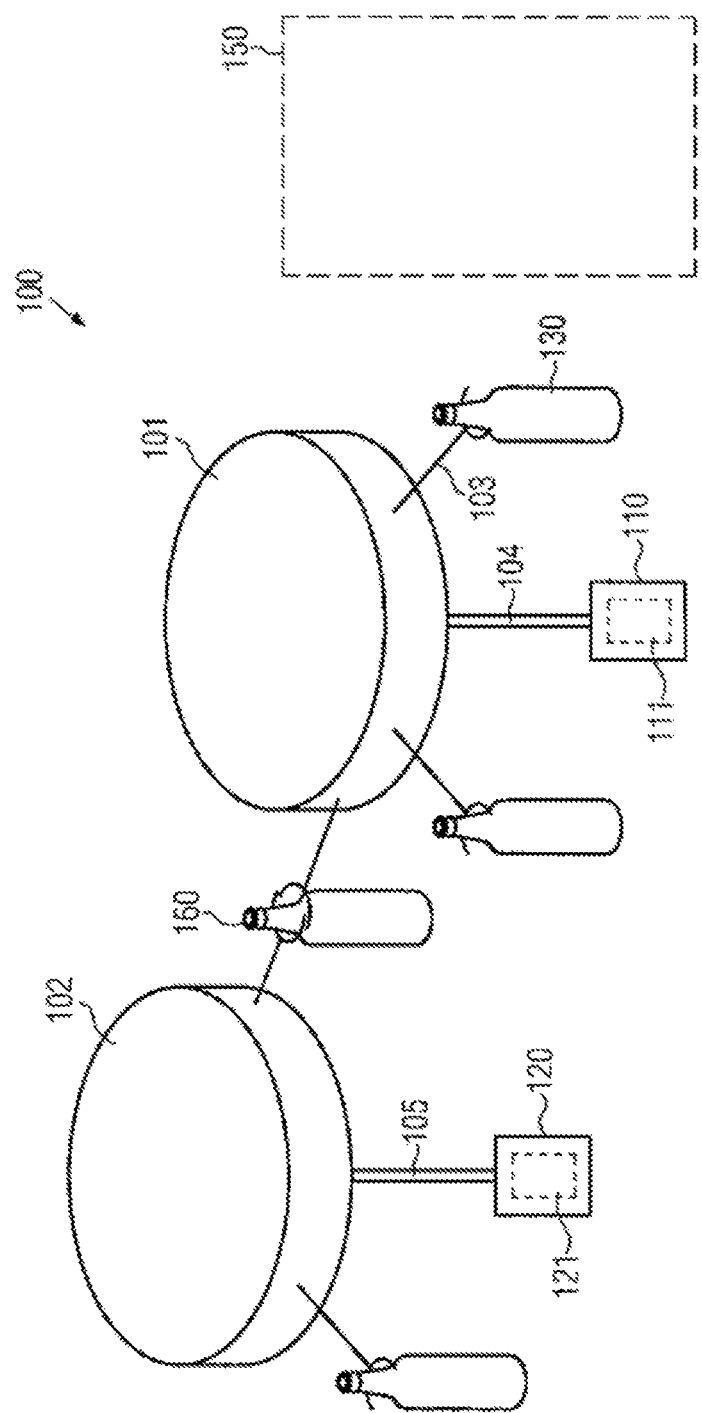
FIG. 1 shows a schematic representation of a device according to an embodiment of the disclosure.

Starting from the known prior art, it is the object of the invention to provide a method and a device for transporting containers by which, in the event of a malfunction of the position sensor, the transport devices of the containers, and in particular the corresponding servo motors, may be brought to a standstill and simultaneously damages are avoided, at least, however, reduced.

This object is achieved by the method described in embodiments herein and the device for transporting containers described in embodiments herein. Advantageous further developments of the invention are also described.

The method according to embodiments of the invention is characterized in that a) if the position sensor can determine the current position of the transport device, at least one of the servo motors is brought to a standstill in a closed-loop manner using the position determined by the position sensor, or b) if the position sensor cannot determine the current position of the transport device, at least one of the servo motors is brought to a standstill in an open-loop manner, wherein instead of the current position of the transport device determined by the position sensor, a target position of the transport device is used to bring the servo motor to a standstill in an open-loop manner. In both cases, one may thus try to at least partially maintain the synchronization of the movements of the transport devices during the stopping procedure, which may considerably reduce damages to the individual transport devices.

The above mentioned current position may be determined, for example, by an incrementally determined signal of the position sensor which is formed by signal pulses or signal changes (for example from 0 to 1 or vice-versa) that indicate a rotation about a given angle.

In the process of bringing the servo motor to a standstill by open-loop control, the signals of the position sensor are, for example, not consulted to perform an open-loop control.

The method where the servo motor is brought to a standstill may, for example, also be performed when there are differences between an incrementally determined signal and an absolutely determined signal. While the incrementally determined signal transmits new position information every time the servo motor has moved about a given angle (for example 1° or 0.1°), the absolutely determined signal represents, for example, a given position or a position of the servo motor taken at given points in time. The absolutely determined signal may transmit, for example, the information indicating that the rotor of the servo motor has taken the position 350°. The absolutely determined signal is in operation far less frequently transmitted than the incrementally determined signal.

The closed-loop control of the servo motor may compare the absolutely determined signal and the incrementally determined signal and should normally always come to a compliant result. The rotation (angle of rotation) of the servo motor resulting from the total of the incrementally determined signals transmitted between two absolutely determined signals normally has to coincide with the rotation resulting from the difference of the two absolutely determined signals. If, however, the one or the other signal fails, the servo motor may be brought to a standstill with the above method, depending on which signal fails. As long as, for example, an operation with closed-loop control with the incrementally determined signal is possible, the servo motor is brought to a standstill with it in a closed-loop manner. If the incrementally determined signal fails, the servo motor may be brought to a standstill in an open-loop manner with the above method.

In one embodiment, one of the servo motors is brought to a standstill with some delay that is smaller than the delay maximally possible for the servo motor. The torques acting on the transport device may thus be reduced which may minimize damages during possible collisions of individual components of the transport devices.

In another embodiment, b) includes that a current indicator is set in the direction of the target position independent of the torque applied to the servo motor. Thus, the servo motor may be reliably forced to a standstill.

In a further development of this embodiment, the maximally possible current for the current indicator is set for the time required for achieving the standstill of the servo motor. Possible deviations also in the movement of the transport devices with respect to each other may be thus reduced which reduces the risk of further damages.

Furthermore, b) may include that the position is determined with a virtual position sensor instead of the position sensor. Since the actual position sensor of the servo motor is no longer able to determine the current position of the transport device, a corresponding virtual position sensor may be advantageously used to virtually provide the target position of the servo motor as the current position for the control of the movement of the servo motor.

In a further development of this embodiment, the position is determined by determining and evaluating voltage or current applied to a terminal of at least one servo motor. This permits, alternatively or additionally to the use of the target position of the servo motor, an improvement of precision in view of the actual (current) position of the servo motor which may further reduce the deviation of the movement of the transport devices with respect to each other and thus prevent damages.

In one embodiment, b) includes that the determination of the position is effected by at least one machine component other than the position sensor. Instead of the not perfectly functioning position sensor, thus a further machine component may be used which may optionally determine the current position of the servo motor in a more reliable way. The open-loop control of the servo motor to the standstill may thus be more precisely which may further reduce damages to the transport devices.

In a further development of this embodiment, the machine component is a standby position sensor or a position sensor of another drive at least indirectly coupled to the servo motors, or a position sensor of another machine component which is driven with the servo motor.

The device according to embodiments of the invention for transporting containers is characterized in that the device is designed to perform the method according to one of the above embodiments to bring the servo motors to a standstill.

In one embodiment, one of the transport devices is a carousel of a container treatment machine with several container retainers, and the other transport device is a transfer starwheel disposed upstream or downstream of the carousel which may supply the carousel with containers or remove containers from the carousel. Since damages to the actual container treatment machine may be expensive and followed by considerable downtimes, the use of the method according to embodiments of the invention may be particularly advantageously used in such a device.

As an alternative, the transport devices may be transfer starwheels successively disposed in the direction of transport of the containers. Downtimes due to defective transfer starwheels may thus be minimized.

In one embodiment, the device comprises a standby position sensor or a further position sensor associated with another drive at least indirectly coupled to the servo motors, or associated with a machine component driven by the servo motor, wherein the standby position sensor or the other position sensor may be utilized for determining the position of the transport device.

If one of the position sensors of the servo motors fails, one may switch to another component to still be able to determine the current position of the respective servo motor, while the servo motors are being brought to a standstill, which further reduces the risk of damages.

Here, too, the current position of the servo motor is determined, for example, by an incrementally determined signal.

FIG. 1 shows a schematic representation of a device 100 according to embodiments of the invention for transporting containers. The containers are usually bottles or other containers of the beverage processing industry. If the transported containers are plastic containers, they may be present as preform or already be completely shaped into containers. Furthermore, the containers may have already been subjected to any possible further treatment step or be transported to a further treatment step.

To this end, the device 100 comprises two transport devices 101 and 102. These are shown here as rotating transfer starwheels that hold and transport the containers 130 with corresponding devices 103. The devices 103 may have various designs and may also be different for the transport devices 101 and 102. In the embodiment shown here, the devices 103 are embodied as neck handling clamps which may grip around the containers underneath their supporting rings. As an alternative, the devices 103 may also be designed, for example, as container retainers with a stationary or rotary plate and a centering bell. All variants for the transport of containers are conceivable.

Equally, the transport devices 101 and 102 do not have to be embodied as rotating transfer starwheels but may also be embodied as linearly operating machines. Furthermore, the transport devices do not necessarily have to be machines exclusively intended for transporting containers. Thus, one of the transport devices 101 or 102, or even both, may also be embodied as container treatment machine. For example, the transport device 101 may be embodied as a labeling machine or filler or a printer. The design of a blow molding machine or mold filling machine or another container treatment machine is conceivable. The transport device 102 may be embodied as a transfer starwheel which supplies the containers to the container treatment machine or discharges the containers treated in the container treatment machine from the latter. The container treatment machine may be designed as a rotary machine.

In the embodiment shown in FIG. 1, the transport devices 101 and 102 are mounted on a drive shaft 104 and 105, respectively, and are rotated by a servo motor 110 and 120 associated with one of the respective transport devices 101 and 102. Here, the movement of the transport devices 101 and 102 is electronically coupled as is represented by the dashed line 140. This means that the servo motors 110 and 120 move the transport devices 101 and 102 in such a manner that a synchronous, i.e. coordinated movement of the transport devices is effected. This means, for example, that the devices 103 represented as clamps move with respect to each other at a transfer point 160 in such a way that a container from one of the transport devices may be transferred to the other one. In case of rotating transport devices 101 and 102 this in particular means that the movement must be effected such that the clamps 103 move with respect to each other at the transfer point 160 such that the container is released from the one clamp of the one transport device and can be picked up by the other clamp of the other transport device. The electronic coupling of the movement of the transport devices may temporarily mean equal speeds/angular velocities of the transport devices or comprise coordinated movement and velocity profiles.

To realize this, the servo motors 110 and 120 are usually electronically controlled by closed-loop control. The closed-loop control may be effected according to a given program which exactly defines at which point in time which angular position of the transport device (target position) must be reached and which angular velocity must be achieved. This program may be stored, for example, in a control unit in a memory associated with the servo motor. A position sensor 111 or 121 which is associated with the respective servo motor 110 or 120, respectively, measures the current position of the servo motor (its current angular position/position or actual position). By comparison of the target position and the actual position (for example in or by the control unit), one may then deduce which voltage or current has to be applied to the servo motor to reach the desired target position. To this end, the position sensor transmits, for example, an incremental signal to the control unit which finally controls the servo motors by closed-loop control. This incremental signal (=incrementally determined signal) is indicative of the relative change of position of the servo motor with respect to a previous position.

The incremental signal may be generated, for example, based on an optical indicator (rotary disk, rotary position disk or the like) detectable by the position sensor, wherein the indicator and at least the part of the position sensor detecting it may move relative with respect to each other. The incremental signal may also be output based on a change of the magnetic flux or the magnetic field strength during the movement of the rotor of the servo motor. Here, the output of the incremental signal is effected each in the event of a change by a certain angle, so that the output frequency of the incremental signal finally depends on the speed of the rotor of the servo motor.

An absolutely determined signal may be output, for example, every time a predefined position (reference position) is reached, for example, every time the rotor reaches or passes a predefined zero mark. It may also be output at fixed times and indicate an absolute position indication of the rotor at the respective point in time. The reference position may correspond, for example, to an arbitrarily selected 0° mark, or additionally, other angular positions may be provided as additional or other reference positions. The reaching of the reference position may be transmitted to the control unit by the position sensor as (absolute) signal, so that, based on the reference signal or the absolute signal, the incremental signal may always be subjected to a verification, and/or that the incremental signals transmitted after an absolute position transmission may be evaluated based on this absolutely determined signal to deduce an angular position given after the absolutely determined position.

In the event of a malfunction of the position sensor, it may occur that the position sensor can no longer transmit the absolute signal or the incremental signal. Both faults, however, may lead to a loss of the synchronization of the movement of the transport devices which may lead to considerable damages.

It is therefore intended that, if a fault occurs in at least one of the position sensors, the servo motors are brought to a standstill to avoid further damages. Here, one distinguishes between two cases according to embodiments of the invention.

In the first case, the position sensor is still functional insofar as it may determine and/or transmit the current position (i.e. the incremental signal). In such a case, the control unit may stop the transport devices using this current position in a closed-loop manner by delaying the movement (the servo motors are slowed down). Since the respective current position of the transport devices may still be determined, this may be effected synchronously or as synchronously as possible, so that damages may be completely or at least partially avoided. Thus, the standstill of the transport devices may be achieved despite the malfunction in a closed-loop manner by comparing target and actual positions and correspondingly controlling the servo motors in a closed-loop manner.

In the second case, the position sensor is no longer able to determine the current position (i.e. for example the incremental signal) of the transport device, so that from this point in time, it is no longer known at which position the servo motor or the transport device is located. It is thus furthermore unknown how the relative position of the transport devices is with respect to each other. However, it is thus neither any longer possible to operate at least the transport device with the defective position sensor in a closed-loop manner, so that in the event of a further, uncontrolled movement of the transport devices damages may occur.

In this case, it is therefore provided that instead of the current position of the servo motor or the transport device, respectively, the provided target position is used, and the transport device and the servo motor, respectively, with the defective position sensor are brought to a standstill using this target position instead of the actual position. The other transport device whose position sensor is still functional may be brought to a standstill in a closed-loop manner by using the comparison from the actual and the target position.

While the use of the target position instead of the actual position cannot correspond to reality, so that the actual position of the transport device deviates from the target position at a given point in time, the target position may at least represent a good approximation or even be perfectly true for the period during which the transport devices are brought to a standstill. Thus, the servo motors may be brought to a standstill nearly or completely synchronously despite the fault of the position sensor, thus avoiding damages.

Instead of this target position, or by the precision with which the current position of the transport device or the servo motor is determined, a virtual position sensor or a machine component other than the defective position sensor may be also used instead of the defective position sensor.

With respect to this embodiment, FIG. 1 shows a further device 150 in a dashed line. This may be a further transport device or container treatment machine. Anyway, this is a movable device where the movement of this device 150 is coupled with the movement of the transport devices 101 and 102, at least, however, with the transport device whose position sensor is defective. The device 150 may, for example, also be driven with a servo motor with which a position sensor is associated. Since the movement of the transport devices 101 and 102 and the device 150 are coupled, the current position of the servo motor with the defective position sensor may be determined at least implicitly with the signal of the position sensor associated with the device 150. This determination may then be used to improve the controlled reaching of the standstill of the servo motors by using the control loop used in normal operation based on the comparison of the actual and target positions with the indirectly determined position instead of the actual position to determine the position of the transport device or the position of the rotor of the servo motor and control it depending on the actual position to be reached.

Figure 2:
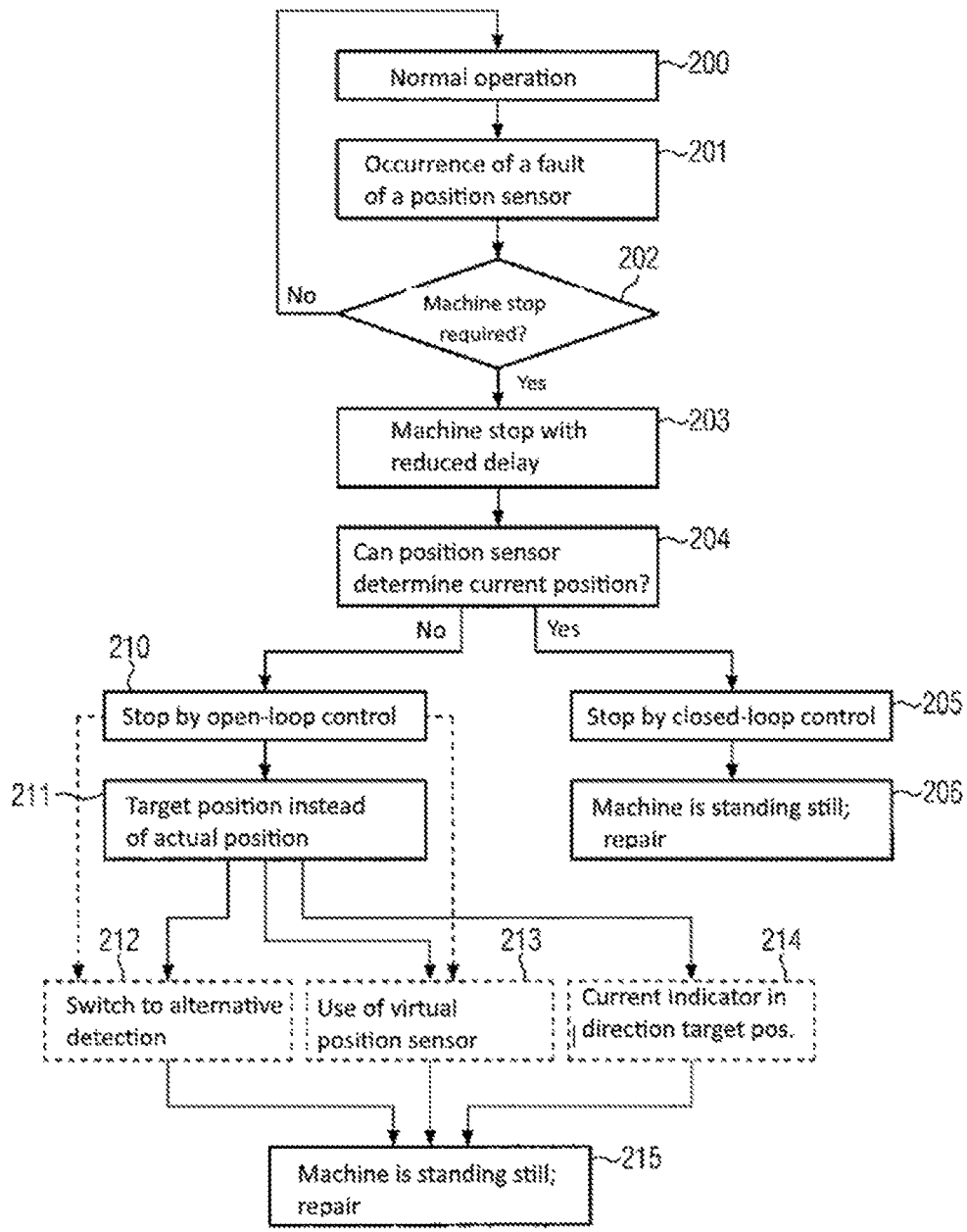
FIG. 2 shows a diagram of the method according to an embodiment of the disclosure.

To further illustrate the method according to embodiments of the invention, FIG. 2 shows an exemplary diagram according to one embodiment of this method.

The method comprises a time interval of the normal operation 200 of the transport devices. During this period, at least the position sensors of the servo motors operate free from defects, and their movements may be controlled by closed-loop control corresponding to the usual comparison of actual position and target position. At an arbitrary point in time, a fault occurs at least in one of the position sensors 201. This may be a plurality of faults. For maintaining the synchronization of the movement of the two transport devices, however, in particular those faults are relevant which are correlated to the above-described signals and the absolute signals. If faults occur at or in the position sensor or in the data lines to the control unit which lead to a non-complete or missing transmission of at least one of these signals, the synchronous closed-loop control of the movement of the servo motors can no longer be completely ensured, so that the synchronization may be lost and damages by colliding parts of the transport devices may occur.

If a fault is detected, it is first of all evaluated whether a machine stop is required 202. This is in particular the case with faults in view of the incremental signals or the absolute signals. With other faults, which at least do not impair the synchronization of the movement, it may be provided that no machine stop is initiated and normal operation is still performed. Such a fault may also be suppressed, for example, in an operator terminal associated with the machine or the transport device.

If a machine stop is required, it is preferably initiated with a reduced delay (brake force) 203. The initiation of a machine stop here includes that the servo motors of the at least two transport devices are brought to a standstill. If this is done with a reduced delay, more time is required to bring the servo motors to a standstill, however, lower brake forces act on the individual servo motors and furthermore on the transport devices, so that the risk of damages due to an abrupt stop of the servo motors and transport devices can be avoided.

After the initiation of the machine stop 203 or in parallel thereto, it is checked 204, whether the at least one defective position sensor can still determine the current position or the actual position of the servo motor (with the incremental signal). If the fault of the position sensor does not concern the transmission or generation or output of the incremental signal, the position sensor may still determine and forward the actual position of the servo motor (first case). In such a case, a controlled movement of the transport devices with respect to each other with closed-loop control is still possible while maintaining the synchronization of the movement. If the position sensor is no longer able to output the incremental signal or to determine the actual position, a control of the movement of the transport devices with respect to each other corresponding to normal operation with closed-loop control is no longer possible (second case).

In the first case, a controlled machine stop 205 is performed while maintaining the closed-loop control of the movement of the transport devices with respect to each other, as is also done in normal operation, until the servo motors or transport devices stand still. As already mentioned above, this may be done with a reduced delay/brake force. For such a case, a special program which contains the velocity profile or movement profile for the servo motors for such a controlled stop and is automatically used if required, i. e. when a corresponding fault occurs, may be also stored in the control unit. The closed-loop control of the servo motors is thus always effected according to the same pattern in the event of such a fault of the position sensor, so that the standstill of the servo motors may be induced reliably and in a controlled manner. Instead of the target positions used in normal operation for controlling the movement of the servo motors by closed-loop control, other target positions adapted to achieving the standstill of the transport devices may be stored in the special program.

As soon as the machine 206 is standing still, the defective position sensor or the complete servo motor including this position sensor can be repaired or replaced. Since no damages occur at the transport devices or the other machines by the controlled stop, as this operation essentially corresponds to the normal operation of the transport devices, the downtimes are considerably reduced when such a controlled stop is performed. It is here particularly advantageous to arrange the servo motors at the transport devices or connect them thereto so as to be quickly replaced. The replacement of the servo motors or position sensors may thus be effected even more quickly and the operation of the plant may be resumed.

In the second case, where a controlled stop by closed-loop control is no longer possible while maintaining the usual closed-loop control of the movement of the servo motors or the transport devices with respect to each other based on the comparison of the current position (actual position) (for example by means of the incremental signal) and the target position of the servo motors, a controlled machine stop 210 by open-loop control is performed.

In the process, instead of the no longer available incremental signal of the position sensor (as it cannot properly determine or transmit this signal at present due to the fault), the target position of the transport device stored in the program that controls the movement of the transport devices in normal operation is used 211. During the controlled stop 210, one can assume that the transport device is at any time at least approximately located at the target position predetermined in the program, and thus the stop of the transport devices or the servo motors can be performed by operating the servo motor, for reaching the next target position starting from a current target position, with the currents/voltages required for changing the position without considering any deviations. While this does not permit any control of the actual position of the transport device or the position of the transport devices with respect to each other, one can assume within a relatively short time that is required to stop the servo motors that the provided target position at least approximately corresponds to the actual position. Thus, by the controlled stop by open-loop control 210, the damages to the transport devices can at least be reduced.

For using the target position instead of the actual position, the current indicator, which functions as a measure for the magnetic field applied to the stator of the servo motor and thus for the movement of the rotor of the servo motor, may, during the performance of the controlled stop 210, always show in the direction of the target position 214 independently of the torque applied to the servo motor. The target position is here the position at which the rotor of the servo motor is located with the applied reduced delay during the machine stop 203 at a given time. It is particularly advantageous if, during the time of the controlled machine stop 210, the current indicator is fed with the maximum current possible for the servo motor with the defective position sensor, so that deviations may be reduced.

To improve the precision of the target position compared to the actual position of the motor, a virtual position sensor may also be used as an alternative or in addition 213. This may be achieved, for example, by the actual position of the rotor or the transport device being deduced based on the voltage or the current applied at the servo motor at least at one terminal. These measured values, i. e. the voltages and currents, may be utilized to modify the target position and replace it by an approximation better corresponding to the actual position. As an alternative, the use of the target position instead of the actual position may be omitted, and the actual position deduced from the voltages and currents may be used for performing the controlled stop.

Furthermore, instead of the defective position sensor, a standby position sensor which is associated with the servo motor may be used 212. Thus, during the controlled stop with open-loop control 210, one may access the actual position of the servo motor or the transport device, and thus, the machine damages occurring during the controlled stop may be further reduced. Since the period during the changeover from the actual position sensor to the standby position sensor during which no incremental signal at all is available (since none of the position sensors generates this signal during the period) is short, the target position may be used instead of the actual position 211 during this period.

It is also conceivable that as an alternative detection 212, the still functioning position sensor of the other transport device is used, and based on the actual position of this servo motor, the actual position of the servo motor whose position sensor has a fault is determined.

As an alternative, the actual position of a further machine component, as is represented by way of example in FIG. 1 with reference numeral 150, may be utilized to determine the actual position of the servo motor with the defective position sensor. Due to the in this case longer cable paths and the required conversion to the actual position of the servo motor with the defective position sensor, this embodiment may also be utilized for correcting, at certain time intervals during the controlled machine stop 210, the initially assumed target positions used instead of the actual positions.

The alternatives 212 and 213, i. e. the use of an alternative position sensor or a standby position sensor, and the change to a virtual position sensor, may be used for achieving a controlled machine stop even without the use of the target position instead of the actual position (step 211), so that only the positional data of the servo motor with the defective position sensor gathered by it are used for the open-loop control or for carrying out the controlled machine stop by open-loop control. This is indicated in FIG. 2 by the dashed arrows.

When the transport devices or the machine 215 stand still, the position sensor or the servo motor may be repaired analogously to the controlled stop.

What is claimed is:

1. A method comprising:
   determining, for at least two transport devices that are each driven by a respective servo motor of at least two servo motors, positions of the at least two servo motors based on position sensors associated with the at least two servo motors;
   effecting closed-loop control of the at least two servo motors based on a comparison of the positions of the at least two servo motors to target positions of the at least two servo motors; and
   bringing the at least two servo motors to a standstill in the event of a fault of one of the position sensors, wherein:
   a) a servo motor of the at least two servo motors is brought to a standstill in a closed-loop manner using the position determined by the position sensor associated with the servo motor if the position sensor can determine a current position of the servo motor, or
   b) the servo motor is brought to a standstill in an open-loop manner if the position sensor associated with the servo motor cannot determine the current position of the servo motor, wherein, instead of the current position of the servo motor determined by the position sensor, a target position of the servo motor is used to stop the servo motor in the open-loop manner.

2. A method according to claim 1, wherein the servo motor is brought to a standstill with a delay that is smaller than a delay that is maximally possible for the servo motor.

3. A method according to claim 1, wherein b) includes that the position sensor cannot generate or forward an incremental signal that is indicative of the current position of the servo motor.

4. A method according to claim 1, wherein b) includes that a current indicator is set in a direction of the target position of the servo motor independent of a torque applied to the servo motor.

5. A method according to claim 4, wherein for a time required for achieving the standstill of the servo motor, a current maximally possible for the current indicator is set.

6. A method according to claim 1, wherein b) includes that the position of the servo motor is determined with a virtual position sensor instead of the position sensor.

7. A method according to claim 6, wherein the position of the servo motor is determined by determining and evaluating voltage or current applied to a terminal of the servo motor.

8. A method according to claim 1, wherein b) includes that the determination of the position of the servo motor is effected by at least one machine component different from the position sensor associated with the servo motor.

9. A method according to claim 8, wherein the machine component is a standby position sensor or a position sensor of another drive at least indirectly coupled with the servo motor.

10. A device for transporting containers, comprising:
    at least two transport devices for the containers;
    at least two servo motors, wherein each of the at least two servo motors drives one of the at least two transport devices;
    at least two position sensors, wherein each of the at least two position sensors is associated with one of the at least two servo motors; and
    at least one control unit, to:
    control the at least two servo motors, by closed-loop control, based on a comparison of positions determined by respective position sensors of the at least two position sensors and respective target positions; and
    bring the at least two servo motors to a standstill in the event of a fault of at least one of the respective position sensors, wherein:
    a) a servo motor of the at least two servo motors is brought to a standstill in a closed-loop manner using the position determined by the position sensor associated with the servo motor if the position sensor can determine a current position of the servo motor, or
    b) the servo motor is brought to a standstill in an open-loop manner if the position sensor associated with the servo motor cannot determine the current position of the servo motor, wherein, instead of the current position of the servo motor determined by the position sensor, a target position of the servo motor is used to stop the servo motor in an open-loop manner.

11. A device according to claim 10, wherein:
    a first one of the at least two transport devices is a carousel of a container treatment machine with several container retainers; and
    a second one of the at least two transport devices is a transfer starwheel disposed upstream or downstream of the carousel configured to perform at least one of I) supply the carousel with containers or II) discharge containers from the carousel.

12. A device according to claim 10, wherein the at least two transport devices are transfer starwheels successively disposed in a direction of transport of the containers.

13. A device according to claim 10, wherein the device comprises a standby position sensor or a further position sensor associated with another drive at least indirectly coupled to the at least two servo motors, wherein the standby position sensor or the further position sensor is to determine the positions of the at least two transport devices.

14. A device according to claim 10, wherein the servo motor is brought to a standstill with a delay that is smaller than a delay that is maximally possible for the servo motor.

15. A device according to claim 10, wherein b) includes that the position sensor cannot generate or forward an incremental signal that is indicative of the current position of the servo motor.

16. A device according to claim 10, wherein b) includes that the determination of the position is effected by at least one machine component different from the position sensor.

17. A device according to claim 10, wherein b) includes that a current indicator is set in a direction of the target position independent of a torque applied to the servo motor.

18. A device according to claim 17, wherein for a time required for achieving the standstill of the servo motor, a current maximally possible for the current indicator is set.

19. A device according to claim 10, wherein b) includes that the position is determined with a virtual position sensor instead of the position sensor.

20. A device according to claim 19, wherein the position is determined by determining and evaluating voltage or current applied to a terminal of the servo motor.

* * * * *